(12) United States Patent
Han et al.

(10) Patent No.: US 8,346,309 B2
(45) Date of Patent: Jan. 1, 2013

(54) MOBILE TERMINAL

(75) Inventors: Dong-Youp Han, Anyang (KR); Young-Woo Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 347 days.

(21) Appl. No.: 12/540,224

(22) Filed: Aug. 12, 2009

(65) Prior Publication Data

US 2010/0144394 A1 Jun. 10, 2010

(30) Foreign Application Priority Data

Dec. 5, 2008 (KR) .......................... 10-2008-0123597

(51) Int. Cl.
*H04B 1/38* (2006.01)
(52) U.S. Cl. .................. 455/566; 455/550.1; 455/556.1; 345/690; 345/694; 345/641
(58) Field of Classification Search ............... 455/550.1, 455/556.1, 566; 345/690, 694, 641
See application file for complete search history.

(56) References Cited

U.S. PATENT DOCUMENTS

2008/0284696 A1* 11/2008 Rosenblatt .................... 345/87
2008/0318616 A1* 12/2008 Chipalkatti et al. ....... 455/550.1

* cited by examiner

*Primary Examiner* — Fayyaz Alam
(74) *Attorney, Agent, or Firm* — Birch, Stewart, Kolasch & Birch, LLP

(57) ABSTRACT

A mobile terminal is provided. The mobile terminal includes a case forming an outer appearance of the mobile terminal, a window formed at one surface of the case, a touch sensor located at the window, the touch sensor being configured to detect a touch input through the window, at least one pattern formation unit disposed in the case, the at least one pattern formation unit being configured to project a light pattern in one direction when the touch sensor is activated, and a path variation unit configured to vary the direction of the projected light such that the projected light pattern is directed toward the window.

17 Claims, 6 Drawing Sheets

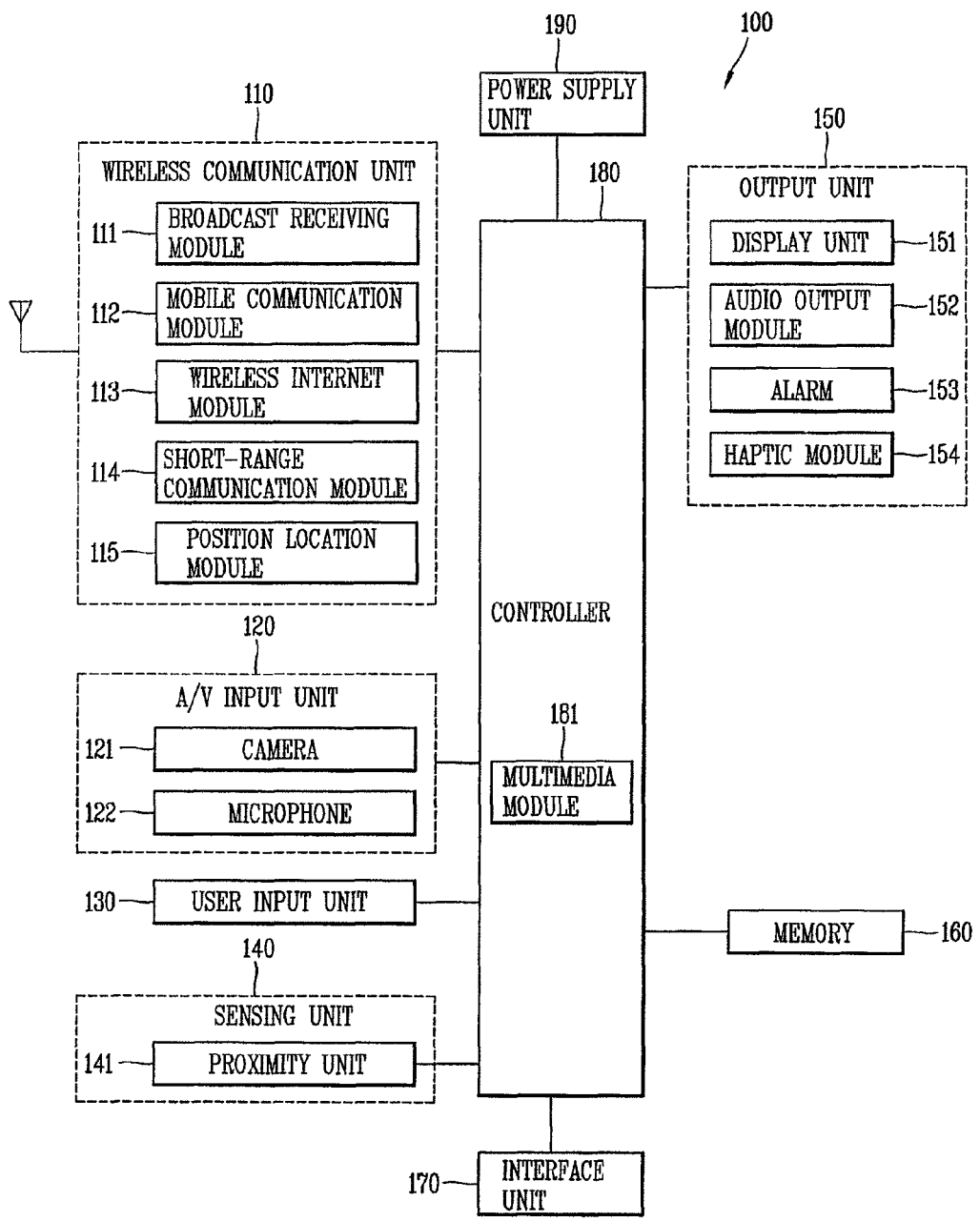

MOBILE TERMINAL

CROSS-REFERENCE TO RELATED APPLICATIONS

This application claims priority to Korean Application No. 10-2008-0123597, filed on Dec. 5, 2008, which is incorporated by reference herein in its entirety.

BACKGROUND OF THE INVENTION

1. Field of the Invention

The present invention relates generally to a mobile terminal configured to receive a touch input, and, more particularly, to a mobile terminal that displays light patterns on a window of the mobile terminal that are selectable by the touch input.

2. Description of Related Art

Terminals can be divided into mobile terminals and stationary terminals according to their portability. Furthermore, mobile terminals may be divided into handheld terminals and vehicle mounted terminals according to whether the terminals are intended to be carried directly by the user.

Mobile terminals have become more multifunctional, such that the mobile terminals can be used to capture still images or moving images, play music or video files, play games, receive broadcast, and the like. As a result, mobile terminals may be implemented as an integrated multimedia player (device). In order to implement complicated functions of the multimedia player, various advances are being made in hardware and software. For instance, a user interface to allow a user to easily and conveniently search or select functions is provided. Recently, touch screens have been implemented in mobile terminals.

BRIEF SUMMARY OF THE INVENTION

An object of the present invention is to provide a user input unit that is visible, while enabling a touch input, in a mobile terminal.

To achieve this and other advantages and in accordance with the purpose of the present invention, as embodied and broadly described herein, there is provided a mobile terminal including a case forming an outer appearance of the mobile terminal, a window formed at one surface of the case, a touch sensor located at the window, the touch sensor being configured to detect a touch input through the window, at least one pattern formation unit disposed in the case, the at least one pattern formation unit being configured to project a light pattern in one direction when the touch sensor is activated, and a path variation unit configured to vary the direction of the projected light such that the projected light pattern is directed toward the window.

In another aspect of the present invention, there is provided a mobile terminal including a case forming an outer appearance of the mobile terminal, a window formed at one surface of the case, a touch sensor located at the window, the touch sensor being configured to detect a touch input through the window, a pattern formation unit disposed in the case, the pattern formation unit being configured to project a plurality of light patterns in one direction when the touch sensor is activated, and a path variation unit configured to vary the direction of the projected light such that the plurality of projected light patterns are directed toward the window.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 1 is a block diagram of a mobile terminal in accordance with a first embodiment of the present invention;

DETAILED DESCRIPTION OF THE INVENTION

Figure 2A:
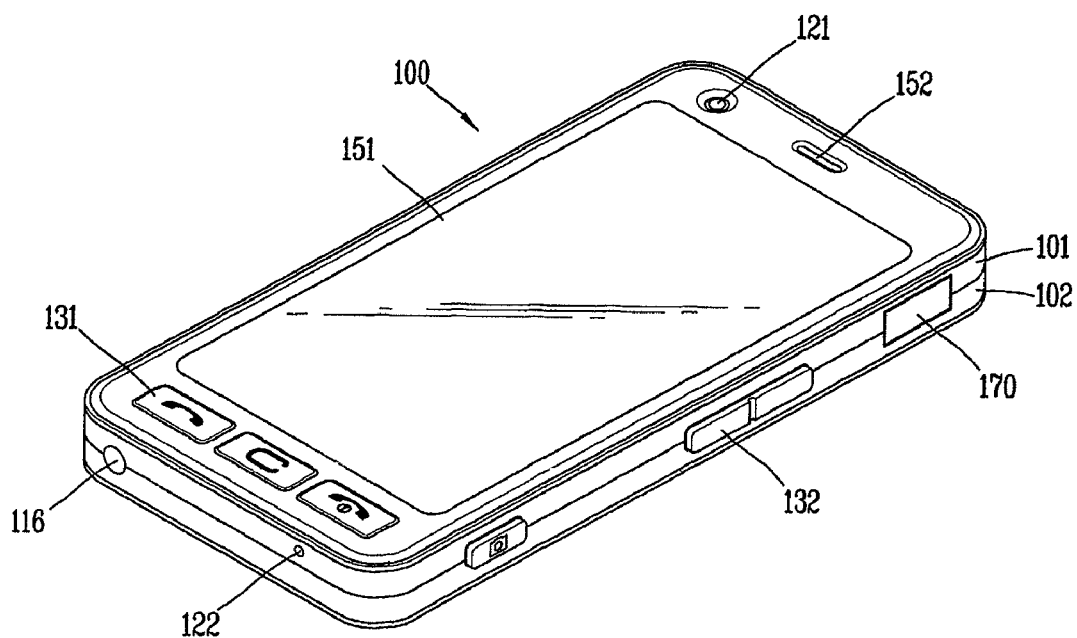
FIG. 2A shows a front perspective view of the mobile terminal in accordance with an exemplary embodiment of FIG. 1.

Description will now be given in detail of exemplary configurations of mobile terminals according to the present invention, with reference to the accompanying drawings. In this description, the same or similar reference numerals are given to the same or similar configurations in different exemplary embodiments, and their description will be understood by the firstly provided description. A singular representation used in this specification may include a plural representation, unless it contextually denotes an obviously different meaning.

Hereinafter, suffixes "module," "unit," or "portion" for components are merely provided for facilitating explanation of the present invention, and thus they are not provided a specific meaning or function. Hence, it should be noticed that "module," "unit," or "portion" can be used interchangeably.

The mobile terminals described in the following description may be implemented as different types of terminals, such as mobile phones, smart phones, notebook computers, digital broadcast terminals, Personal Digital Assistants (PDA), Portable Multimedia Players (PMP), navigators, and the like. However, it can easily be understood that the configuration described in the embodiments of the present invention can be applied to stationary terminals, such as digital TV sets, desktop computers, and the like, excluding the case where the configuration described is applicable only to a mobile terminal.

Furthermore, while the mobile terminal of the present invention will be described as having a bar-like body, the present invention is not limited to this type, but can be applied to various types, such as a slide type, a folder type, a swing type, a swivel type and the like, each of these types having two or more bodies coupled to each other to be relatively movable.

As shown in FIG. 1, the mobile terminal 100 may include several components, such as a wireless communication unit 110, an Audio/Video (A/V) input unit 120, a user input unit 130, a sensing unit 140, an output unit 150, a memory 160, an interface unit 170, a controller 180, a power supply unit 190, and the like. While, FIG. 1 shows the mobile terminal 100 having various components, it is understood that implementing all of the illustrated components is not required. And greater or fewer components may be implemented.

The wireless communication unit 110 may include one or more modules that permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a position location module 115, and the like.

The broadcast receiving module 111 receives a broadcast signal and/or broadcast associated information from an external broadcast managing entity via a broadcast channel. The broadcast channel may include a satellite channel and a terrestrial channel. The broadcast managing entity may include a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and is received by the mobile communication module 112. The broadcast associated information may be implemented in various formats, for instance, broadcast associated information may include Electronic Program Guide (EPG) for Digital Multimedia Broadcasting (DMB), Electronic Service Guide (ESG) for Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 111 may be configured to be suitable for every broadcast system transmitting broadcast signals as well as the digital broadcasting systems. Broadcast signals and/or broadcast associated information received via the broadcast receiving module 111 may be stored in a suitable device, such as a memory 160.

The mobile communication module 112 transmits/receives wireless signals to/from at least one of various network entities (e.g., base station, an external mobile terminal, a server, etc.) on a mobile communication network. As such, the wireless signals may include audio call signals, video (telephony) call signals, or various formats of data according to transmission/reception of text/multimedia messages.

The wireless internet module 113 supports wireless internet access for the mobile terminal 100. This module may be internally or externally coupled to the mobile terminal 100. Examples of such wireless internet access may include Wireless LAN (WLAN) (Wi-Fi), Wireless Broadband (Wibro), Worldwide Interoperability for Microwave Access (Wimax), High Speed Downlink Packet Access (HSDPA), and the like.

The short-range communication module 114 is a module for short-range communications. Suitable technologies for implementing this module may include BLUETOOTH, Radio Frequency IDentification (RFID), Infrared Data Association (IrDA), Ultra-WideBand (UWB), ZigBee, and the like.

The position location module 115 is a module for detecting or calculating a position of a mobile terminal. An example of the position location module 115 may include a Global Position System (GPS) module.

Referring to FIG. 1, the A/V input unit 120 is configured to provide audio or video signal input to the mobile terminal 100. The A/V input unit 120 may include a camera 121 and a microphone 122. The camera 121 receives and processes image frames of still pictures or video obtained by image sensors in a video call mode or an image capturing mode. The processed image frames may be displayed on a display unit 151. The image frames processed by the camera 121 may be stored in the memory 160 or transmitted via the wireless communication unit 110. Two or more cameras 121 (see 121' of FIG. 2B) may be provided according to an exemplary embodiment of the mobile terminal 100. The microphone 122 may receive an external audio signal while the mobile terminal 100 is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data inputted by a user to control the operation of the mobile terminal 100. The user input unit 130 may include a keypad, a dome switch, a touchpad (e.g., static pressure/capacitance), a jog wheel, a jog switch, and the like.

The sensing unit 140 provides status measurements of various aspects of the mobile terminal 100. For instance, the sensing unit 140 may detect an open/close status of the mobile terminal 100, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply unit 190, the presence or absence of a coupling or other connection between the interface unit 170 and an external device. The sensing unit 140 may include a proximity sensor 141.

The output unit 150 is configured to output an audio signal, a video signal, or a tactile signal. The output unit 150 may include a display unit 151, an audio output module 152, an alarm 153, a haptic module 154, and the like.

The display unit 151 may output information processed in the mobile terminal 100. For example, when the mobile terminal 100 is operating in a phone call mode, the display unit 151 will provide a User Interface (UI) or a Graphic User Interface (GUI) that includes information associated with the call. As another example, if the mobile terminal is in a video call mode or an image capturing mode, the display unit 151 may additionally or alternatively display images captured and/or received, UI, or GUI. The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, and the like. Some of these displays may be implemented as a transparent type or an optical transparent type through which the interior is visible, which will be referred to as a 'transparent display'. A representative example of the transparent display may include a Transparent OLED (TOLED), and the like. The rear surface of the display unit 151 may also be implemented to be transparent. Under this configuration, a user can view an object positioned at a rear side of a mobile terminal through a region occupied by the display unit 151 of the mobile terminal.

The display unit 151 may be implemented using two or more display units according to a another exemplary embodiment of the mobile terminal 100. For example, a plurality of display units 151 may be arranged on one surface and may be spaced apart from or integrated with each other, or may be arranged on different surfaces of the mobile terminal 100.

If the display unit 151 and a touch sensitive sensor (referred to as a touch sensor) are provided as a layered structure, the structure may be referred to as a touch screen. In this instance, the display unit 151 may be used as an input device in addition to an output device. The touch sensor may be implemented as a touch film, a touch sheet, a touch pad, and the like. The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure. When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Still referring to FIG. 1, a proximity sensor 141 may be arranged at an inner region of the mobile terminal 100 covered by the touch screen, or near the touch screen. The proximity sensor 141 is a sensor configured to sense the presence or the absence of an object approaching a particular surface, or an object disposed near a particular surface, by using an electromagnetic field or infrared rays without requiring a mechanical contact. The proximity sensor 141 has a longer lifespan and a more enhanced utility than a contact sensor. The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, proximity of a pointer to the touch screen is sensed by changes of an electromagnetic field. In this arrangement, the touch screen (touch sensor) may be categorized as a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and the like. The audio output module 152 may output audio signals relating to functions performed in the mobile terminal 100, e.g., sound indicating that a call is received or a message is received, and the like. The audio output module 152 may include a receiver, a speaker, a buzzer, and the like.

The alarm 153 outputs signals notifying occurrence of events from the mobile terminal 100. The events occurring from the mobile terminal 100 may include a received call, a received message, key signal input, touch input, and the like. The alarm 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be considered as an implementation of the alarm 153.

The haptic module 154 generates various tactile effects that a user can feel. A representative example of the tactile effects generated by the haptic module 154 includes vibration. Vibration generated by the haptic module 154 may have a controllable intensity, a controllable pattern, and the like. For instance, different vibration may be output in a synthesized manner or in a sequential manner. The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like. The haptic module 154 may be configured to transmit tactile effects (signals) through a user's direct contact, or a user's muscular sense using a finger or a hand. The haptic module 154 may be provided as two or more in number according to an exemplary embodiment of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen. The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-Only Memory (EEPROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to one or more components in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like. The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals input from the cradle by a user to the mobile terminal 100. Such various command signals or power input from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component. The controller 180 can perform a pattern recognition processing so as to recognize writing or drawing input on the touch screen as text or image.

The power supply unit 190 provides power required by various components under the control of the controller 180. The provided power may be internal power, external power, or combination thereof.

Various embodiments described herein may be implemented in a computer-readable medium using, for example, software, hardware, or some combination thereof. For a hardware implementation, the embodiments described herein may be implemented within one or more Application Specific Integrated Circuits (ASICs), Digital Signal Processors (DSPs), Digital Signal Processing Devices (DSPDs), Programmable Logic Devides (PLDs), Field Programmable Gate Arrays (FPGAs), processors, controllers, microcontrollers, microprocessors, other electronic units designed to perform the functions described herein, or a selective combination thereof. In some cases, such embodiments are implemented by the controller 180. For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

As shown in FIG. 2A, an exemplary embodiment of mobile terminal 100 is provided. The mobile terminal 100 includes a body having a case (casing, housing, cover, or the like) defining an external appearance of the mobile terminal 100. In this exemplary embodiment, the case may be divided into a first or front case 101 and a second or rear case 102. A space formed between the front case 101 and the rear case 102 may accommodate various electric components. At least one intermediate case (not shown) may further be disposed between the front and the rear cases 101 and 102. Each of these cases 101 and 102 may be formed of an injected synthetic resin or may be formed of a metal, such as stainless steel (STS), titanium (Ti) or the like.

Generally, the front case 101 may be provided with a display unit 151, an audio output module 152, a camera 121, user input unit 130 in the form of manipulating units 131 and 132, a microphone 122, an interface unit 170, and the like.

The display unit 151 may occupy a significant portion of a main surface of the front case 101. The audio output module 152 and the camera 121 may be disposed at a region adjacent to one end portion of the display unit 151, and a manipulating unit 131 and a microphone 122 may be disposed at a region adjacent to another end portion of the display unit 151. The manipulating unit 132, the interface unit 170, and the like may be disposed at side surfaces of the front case 101 and/or the rear case 102.

Various types of information may be displayed on the display unit 151. Such information may be displayed in the form of characters, numerals, symbols, graphics or icons. For inputting such information, at least one or more characters, numerals, symbols, graphics or an icons may be displayed in a certain arrangement, so as to be implemented as a type of a keypad. Such implementation may be referred to as a so-called 'soft key'. The display unit 151 may be operated by using the entire exposed area of the display unit 151, or be operated by divided the exposed area of the display unit 151 into a plurality of regions. For the latter configuration, the plurality of regions may be operated in cooperation with each other or independently of each other.

The user input unit 130 may be manipulated to provide a command input for controlling the operation of the mobile terminal 100, and includes the plurality of manipulating units 131 and 132. The combination of manipulating units 131 and 132 may be referred to as a manipulating portion. The manipulating portion may be manipulable by a user in any tactile manner. Contents input by the manipulating units 131 and 132 may variously be set. For example, the first manipulating unit 131 may be configured to input commands such as START, END, SCROLL or the like, and the second manipulating unit 132 may be configured to input a command, such as adjusting an audio sound, converting the display unit 151 into a touch-sensitive mode, or the like.

The first manipulating unit 131 may be configured to receive a touch input. Upon a touch sensor being activated, a pattern (see 133 in FIG. 3a) relating to the touch input is indicated (viewable). This can be implemented by a pattern formation unit 134 and path variation unit 136 (see FIG. 4) disposed within the terminal body of the mobile terminal 100.

Figure 2B:
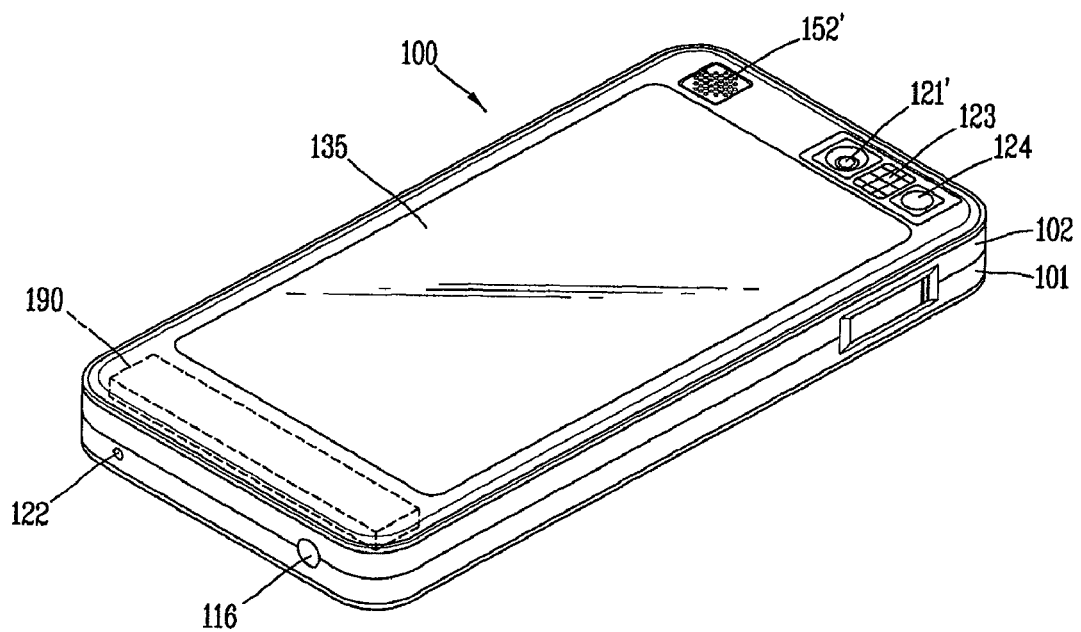
FIG. 2B shows a rear perspective view of the mobile terminal of FIG. 2A.

As shown in FIG. 2B, a rear surface of the terminal body of the mobile terminal 100, namely, the rear case 102 may further be provided with a camera 121'. The camera 121' faces a direction that is opposite to a direction faced by the camera 121, and may have a different number of pixels from those of the camera 121. For example, the camera 121 may operate with a relatively lower pixel amount (lower resolution). Thus, the camera 121 may be useful when a user desires to capture his face and send it to another party during a video call or the like. On the other hand, the camera 121' may operate with a relatively higher pixel amount (higher resolution) such that it can be useful for a user to obtain higher quality pictures for later use. Such cameras 121 and 121' may be installed in the terminal body to be rotatable or popped out from the terminal body of the mobile terminal 100.

A flash 123 and a mirror 124 may additionally be disposed adjacent to the camera 121'. The flash 123 operates in conjunction with the camera 121' when taking a picture using the camera 121'. The mirror 124 can cooperate with the camera 121' to allow a user to photograph himself in a self-portrait mode.

An audio output module 152' may further be disposed at a rear surface of the terminal body of the mobile terminal 100. The audio output module 152' can cooperate with the audio output module 152 to provide stereo output. Also, the audio output module 152' may be configured to operate as a speakerphone.

A broadcast signal receiving antenna 116 may further be disposed at the side surface of the terminal body of the mobile terminal 100 in addition to an antenna for communications (not shown). The antenna 116 may be a part of the broadcast receiving module 111 (see FIG. 1) and may be retractable into the terminal body.

A power supply unit 190 for supplying power to the mobile terminal 100 may be mounted to the terminal body of the mobile terminal 100. The power supply unit 190 may be internally disposed at the terminal body of the mobile terminal 100, or be detachably disposed outside the terminal body of the mobile terminal 100.

A touch pad 135 for detecting a touch input may be disposed at the rear case 102. The touch pad 135 may also be configured to be transparent, similar to the display unit 151. In this arrangement, if the display unit 151 is configured to output information on both of its surfaces, such information can be identified through the touch pad 135. Information output on both surfaces may all be controlled by the touch pad 135. Alternatively, a display may further be mounted on the touch pad 135 so as to provide a touch screen at the rear case 102. The touch pad 135 operates in cooperation with the display unit 151 of the front case 101. The touch pad 135 may be disposed at the rear side of the display unit 151 in parallel with the display unit 151. The touch pad 135 may be the same as or smaller than the display unit 151. The touch pad 135 may be formed to receive a touch input. Also, the touch pad 135 may be configured such that a projected light pattern 133 (see FIG. 3A) relating to a touch input is indicated (viewable) upon a touch sensor being activated. This can be provided by a pattern formation unit 134 and a path variation unit 136 (see FIG. 4).

Figure 3A:
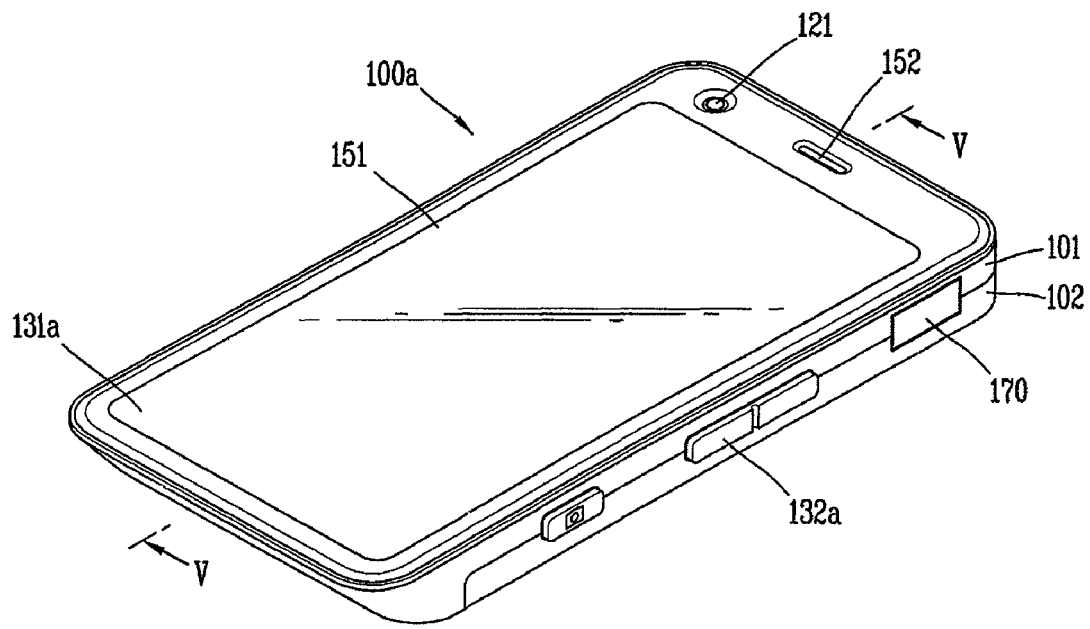
FIGS. 3A and 3B are elevation views showing states before and after, respectively, a user operates an input unit of the mobile terminal in a touch recognition mode according to the present invention.
Figure 3B:
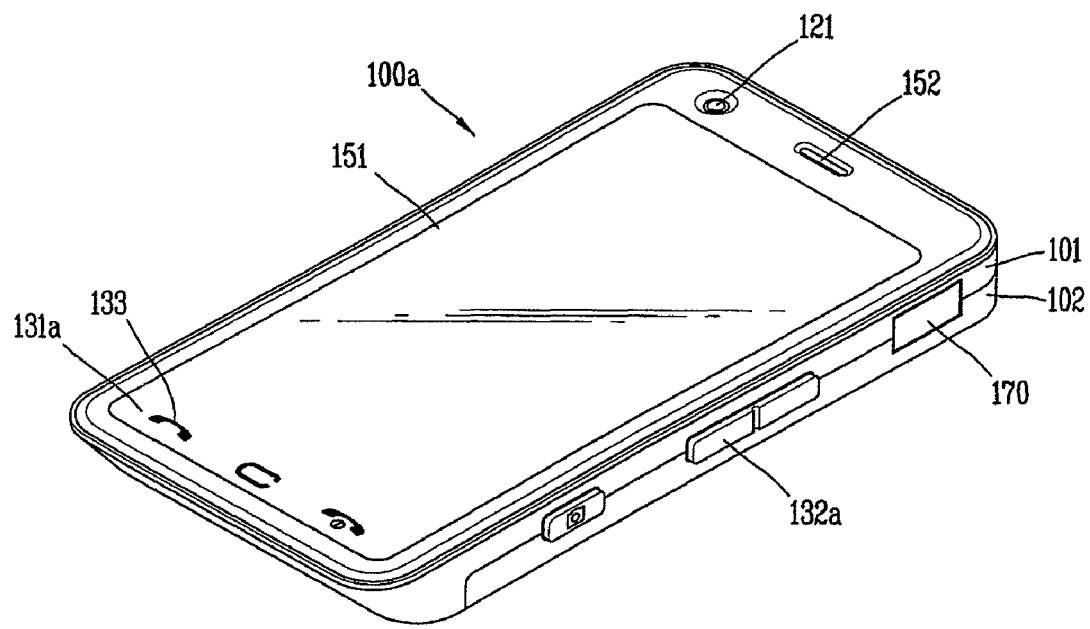

As shown in FIGS. 3A and 3B, a mobile terminal 100a according to another exemplary embodiment is shown in states prior to a user initiating a touch recognition mode and after a user initiates the touch recognition mode, respectively. In this exemplary embodiment, the first manipulation unit 131a may include touch sensors so as to receive touch inputs. The second manipulation unit 132a may be configured to receive a command for converting the first manipulation unit 131a into a touch recognition mode. As shown in FIG. 3A, projected light patterns 133 corresponding to touch inputs are not indicated on a mobile terminal 100a before a touch sensor is activated.

When a user activates a touch sensor of the first manipulation unit 131a by manipulating the second manipulation unit 132a, specific projected light patterns 133 are indicated on the first manipulation unit 131a, as shown in FIG. 3B. The projected light patterns 133 may be characters, symbols, logos and the like, by which the user input unit 130 (see FIG. 1), which does not show the projected light pattern 133 corresponding to touch input when not in use, can be implemented.

The present invention is not limited to this configuration, but many variations may be provided. For instance, FIG. 3A may show the mobile terminal 100a in an idle mode, whereas FIG. 3B may show the mobile terminal 100a in a specific mode. That is, when the mobile terminal 100a in the idle mode is converted into the specific mode, the specific projected light patterns 133 may be indicated on the first manipulation unit 131a. The mobile terminal 100a may go into the idle mode where a user signal input is not detected for a predetermined time or where the mobile terminal 100a is set to be manually converted into the idle mode by the user. In the idle mode, the display unit 151 of the mobile terminal 100a is deactivated, thereby reducing power consumption. The specific mode may be a mode for activating functions of the mobile terminal 100a, such as a character or number input mode.

A configuration of the mobile terminal 100a operating in the aforesaid manner will be described with reference to FIGS. 4 and 5. An audio hole 152a aligned with the audio output module 152 and an image window 121a aligned with the camera 121 (see FIG. 2A) may be disposed at one side of the front case 101. The image window 121a may be formed of a transparent material through which light is emitted.

A circuit board 117, a speaker 152b, a camera 121 and the like may be disposed at the rear case 102. The circuit board 117 may correspond to the controller 180 (see FIG. 1) for operating various functions of the mobile terminal 100a. The speaker 152b, the camera 121, the display 151a, and the like may be disposed on the circuit board 117. The speaker 152b may be disposed to be aligned with the audio hole 152a and the camera 121 may be disposed to be aligned with the image window 121a.

A window 151b for covering a display 151a may be coupled to the front case 101. The window 151b may be formed of a transparent material, such as a transparent synthetic resin, a tempered glass, or the like. However, the window 151b may include a non-transparent region 155a where light cannot be transmitted therethrough.

A window hole 151c aligned with the window 151b may be formed at the front case 101. The display 151a may be disposed on the rear case 102 to be aligned with the window hole 151c. Accordingly, a user is capable of viewing information output from the display 151a. The window 151b may include a display region 155b which can have an area corresponding to the display 151a. As such, the display region 155b and the display 151a may be referred to as the display unit 151 (see FIG. 1).

A manipulation region 155c may be formed adjacent to one end portion of the front case 101. The non-transparent region 155a may be formed between the manipulation region 155c and the display region 155b. The non-transparent region 155a may be formed of a non-transparent material or be surface-processed such that light cannot be transmitted therethrough.

The window 151b may be provided with a touch sensor 156, which is configured to detect a touch input and formed of a transparent material. A portion of the touch sensor 156 corresponding to the display region 155b of the window 151b may be associated with image (video) information output on the display 151a, while a portion corresponding to the manipulation region 155c may be associated with the first manipulation unit 131a (see FIG. 3A). The implementation of this exemplary embodiment may not be limited to one touch sensor 156. Rather, a plurality of touch sensors (not shown) may be provided to be disposed at each of the display region 155b and the manipulation region 155c.

Pattern formation units 134 may be formed, either at the front case 101, or the rear case 102. The pattern formation units 134 may be disposed at corresponding positions in the non-transparent region 155*a* of the window 151*b*. Each of the pattern formation units 134 may be configured to project a specific projected light pattern 133 (see FIG. 2A and FIG. 3B) once the touch sensor 156 is activated. Alternatively, the pattern formation units 134 may be configured to project the projected light patterns 133 when the mobile terminal is converted from an idle mode into a specific mode.

Figure 4:
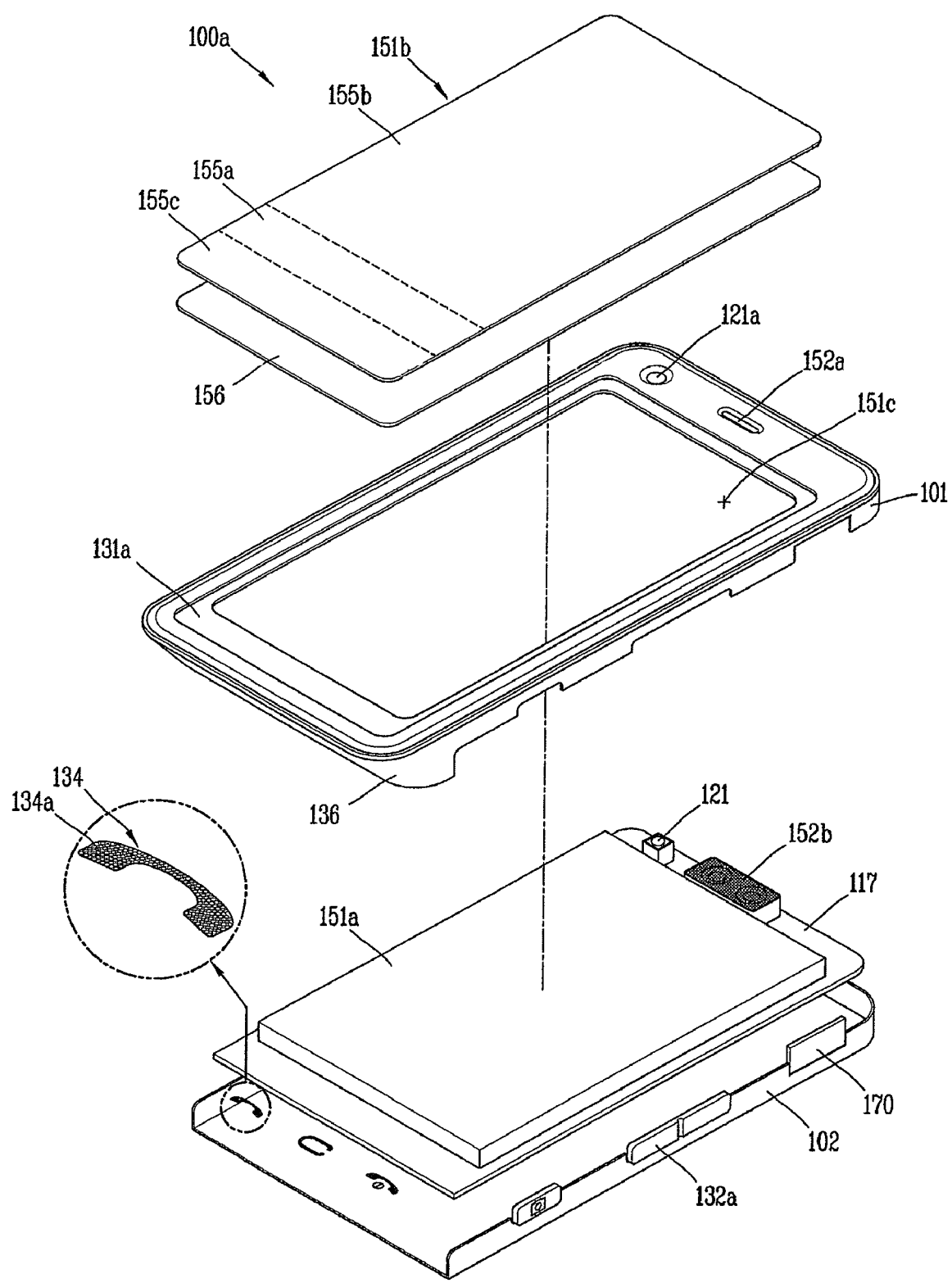
FIG. 4 shows an exploded perspective view of the mobile terminal of FIG. 3A.
Figure 5:
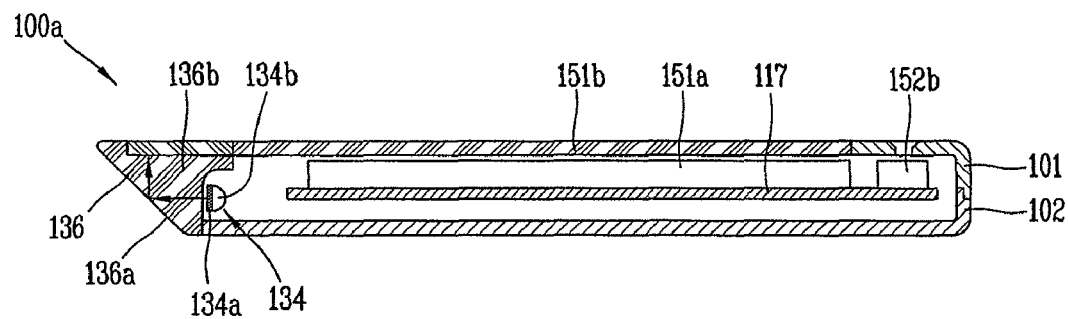
FIG. 5 shows a partial cross-sectional view of the mobile terminal taken along the line V-V of FIG. 3A.

Each of the pattern formation units 134 may be disposed to form a corresponding projected light pattern 133 by a combination of a plurality of optical sources 134*a* (see the detail view of 134 in FIG. 4). The optical sources 134*a* may be light-emitting diodes (LEDs), for example, and the combination of the plurality of LEDs may be arranged as an LED matrix module, thereby forming various patterns. As shown in FIG. 5, each pattern formation unit 134 may include a reflection mirror 134*b* for reflecting light such that light emitted from the optical sources 134*a* can be projected in one direction. Each pattern formation unit 134 may be formed to project the projected light pattern 133 in a direction parallel to one surface of the window 151*b*. For example, the optical source 134*a* may be disposed to emit light in a direction parallel to a main surface of the window 151*b*.

In this exemplary embodiment, the front case 101 defining the outer appearance of the mobile terminal 100*a* may be formed of a transparent material, for example, a transparent synthetic resin or the like. The front case 101 may be provided with a path variation unit 136. The path variation unit 136 may be configured to reflect the projected light pattern 133 generated from the pattern formation unit 134 such that the projected light pattern 133 can be directed toward and visible on the window 151*b*.

At least part of the path variation unit 136 may be inclined such that the projected light pattern 133 can be reflected toward one surface of the window 151*b*. The path variation unit 136 may include a reflective surface 136*a* and a body 136*b*. The reflective surface 136*a* may be configured such that light can be partially transmitted therethrough and partially redirected. Referring to FIG. 5, the reflective surface 136*a* may be one surface of the front case 101. However, the present invention is not be limited to this configuration. For example, the path variation unit 136 may be formed by reflectively coating one surface of the front case 101, or by mounting a mirror or the like on one surface of the front case 101. Accordingly, light can be prevented from being emitted through the front case 101 or the rear case 102 in directions other than a direction toward the window 151*b*.

The body 136*b* may be formed of a transparent material, and disposed at one end of the case 101. The reflective surface 136*a* may be formed to redirect at least part of the projected pattern. Referring to FIGS. 4 and 5, light generated from the corresponding optical source 134*a* is incident on the reflective surface 136*a* in parallel with the main surface of the window 151*b*, and then redirected at the reflective surface 136*a* in a direction orthogonal to the main surface of the window 151*b*.

Figure 6A:
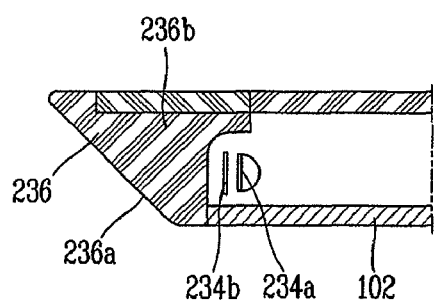
FIGS. 6A and 6B show partial cross-sectional views illustrating additional exemplary embodiments of the mobile terminal of FIG. 5.

As shown in FIG. 6A, an alternative exemplary embodiment of the pattern formation unit is provided. In particular, the pattern formation unit 234 may include an optical source 234*a* and a pattern formation film 234*b*. Light generated from the optical source 234*a* may be emitted through the pattern formation film 234*b*, thereby forming the projected light pattern 133 (see FIG. 3B).

The pattern formation film 234*b* may be configured such that at least part of the light can be emitted therethrough to form the projected light pattern 133. For example, the pattern formation film 234*b* may be configured such that a portion corresponding to the projected light pattern 133 may be transparently formed and a portion not corresponding to the projected light pattern 133 may be non-transparently formed. The pattern formation film 234*b* may be formed by opaquely processing a portion of a transparent film, which does not correspond to the projected light pattern 133. Because the pattern formation film 234*b* may be disposed in the path of the emitted light adjacent to the optical source 234*a*, the pattern formation unit 234 may be implemented with a fewer number of optical sources 234*a*.

Figure 6B:
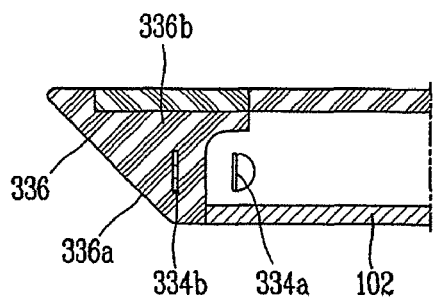

Referring to FIG. 6B, a pattern formation unit 334 according to another exemplary embodiment is provided. This exemplary pattern formation unit 334 may include an optical source 334*a* and a pattern carved portion 334*b*, such as being formed intaglio. Light emitted from the optical source 334*a* is transmitted through the pattern carved portion 334*b* so as to provide the projected light pattern 133. The pattern carved portion 334*b* may be carved in a body 336*b* of a path variation unit 336 by means of a laser so as to correspond to the projected light pattern 133

Figure 7:
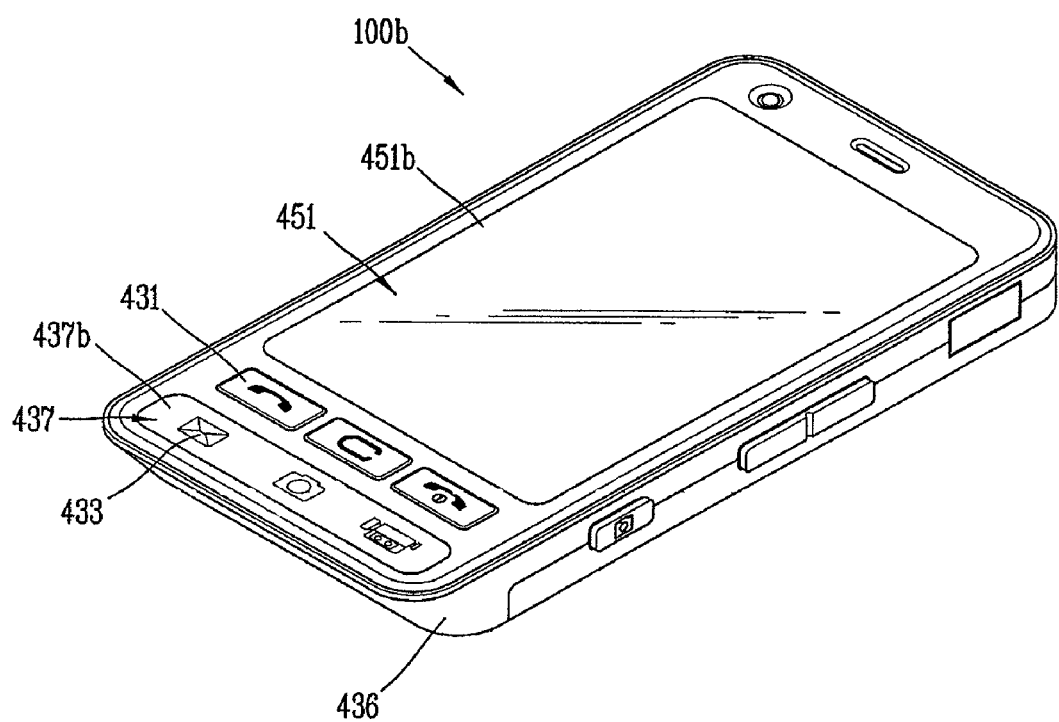
FIG. 7 shows a perspective view of a mobile terminal in accordance with another exemplary embodiment of the present invention.

As shown in FIG. 7, another exemplary embodiment of a mobile terminal 100*b* is provided. In this exemplary embodiment, a first manipulation unit 431 may be formed below a display unit 451, and a third manipulation unit 437 may be formed below the first manipulation unit 431. The display unit 451 for displaying visible information may include a first window 451*b*. The third manipulation unit 437 may include a second window 437*b* disposed to be spaced apart from the display unit 451.

The first manipulation unit 431 may be configured to input commands via a keypad. For instance, the first manipulation unit 431 may be configured to input commands such as START, END, SCROLL or the like. The second window 437*b* may have a touch sensor such that the third manipulation unit 437 can receive a touch input. The third manipulation unit 437 may be configured to receive a command selected by a user, of commands for operating functions of the terminal.

Patterns 433 indicated on the third manipulation unit 437 may be implemented using pattern formation units similar to pattern formation units 134, 234, and 334 (see FIGS. 4, 5, 6A, and 6B) and path variation unit 436 similar to the path variation unit 136 (see FIGS. 4 and 5) in accordance with the present invention. The pattern formation unit may be disposed between the first and second windows 451*b* and 437*b*. The third manipulation unit 437 may be configured such that the pattern 433 is not indicated before the mobile terminal is converted into a touch recognition mode and then the pattern 433 corresponding to a touch input is indicated after the mobile terminal is converted into the touch recognition mode. Accordingly, a manipulation unit 437 is provided that is normally transparent when not used, but is configured to display patterns thereon when used.

A mobile terminal in accordance with at least one embodiment of the present invention having such configuration can implement a user input unit with patterns corresponding to touch inputs, which are not indicated when the user input unit is not used. Hence, the user input unit which can support a touch input and has higher transparency can be provided.

The configurations and methods of the aforesaid embodiments of the mobile terminal with the user input unit having been described is not so limitedly, but all or part of the embodiments can selectively combined so as to derive many variations.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a case forming an outer appearance of the mobile terminal;
a window formed at one surface of the case;
a touch sensor located at the window, the touch sensor being configured to detect a touch input through the window;
at least one pattern formation unit disposed in the case, the at least one pattern formation unit being configured to project a light pattern in one direction when the touch sensor is activated, the light pattern forming at least one of a character, a symbol, and a logo; and
a path variation unit configured to vary the direction of the projected light pattern such that the projected light pattern is directed toward the window.

2. The terminal of claim 1, wherein the pattern formation unit is configured to project the projected light pattern in a direction parallel to a main surface of the window, and
wherein the path variation unit is configured such that at least a part thereof is inclined at an angle with respect to the main surface of the window to reflect the projected light pattern toward the main surface of the window.

3. The terminal of claim 1, wherein the path variation unit includes:
a body formed of a transparent material, the body being disposed at one end of the case; and
a reflective surface disposed at the body, the reflective surface being inclined with respect to a surface of the case, and the reflective surface being configured to redirect at least part of the projected light pattern.

4. The terminal of claim 1, wherein the window includes a non-transparent region formed at least at a part thereof, and the pattern formation unit is disposed behind the non-transparent region.

5. The terminal of claim 1, wherein the pattern formation unit includes a plurality of optical sources in a matrix formation to correspond to the projected light pattern.

6. The terminal of claim 5, wherein each of the optical sources is a light emitting diode.

7. The terminal of claim 1, wherein the pattern formation unit includes:
at least one optical source configured to emit light; and
a pattern formation film disposed in the path of the light being projected, the pattern formation film being configured such that at least part of the light is transmitted therethrough to define the projected light pattern.

8. The terminal of claim 7, wherein the pattern formation film includes a transparent portion corresponding to the projected light pattern, and the remaining portion is not transparent.

9. The terminal of claim 8, wherein the pattern formation film includes a plurality of transparent portions, each transparent portion forming a different projected light pattern, and the remaining portions are not transparent.

10. The terminal of claim 1, wherein the path variation unit includes a transparent body, and the pattern formation unit includes:
at least one optical source configured to emit light; and
at least one carved pattern portion located inside the body of the path variation unit such that at least part of the light is transmitted therethrough to form the projected light pattern.

11. The terminal of claim 10, wherein the pattern formation unit includes a plurality of carved pattern portions located inside the body of the path variation unit, each carved pattern portion forming a different projected light pattern.

12. The terminal of claim 1, wherein the pattern formation unit is configured to project the pattern when the mobile terminal is converted from an idle mode into a specific mode.

13. The terminal of claim 1, wherein the window includes a first window portion having a display for outputting visible information; and
a second window portion disposed to be spaced apart from the display, the touch sensor being located at the second window.

14. The terminal of claim 13, wherein the pattern formation unit is disposed behind the space separating the first and second window portions.

15. A mobile terminal comprising:
a case forming an outer appearance of the mobile terminal;
a window formed at one surface of the case and having a non-transparent region;
a plurality of optical sources disposed in the case, configured to project a plurality of lights and located to be covered by the non-transparent region, the projected lights forming at least one of a character, a symbol and a logo; and
a path variation unit configured to vary the direction of the projected lights such that the plurality of projected lights are directed toward the window.

16. The mobile terminal of claim 15, further comprising a touch pad located on a surface of the case opposite the surface having the window.

17. The mobile terminal of claim 15, wherein the plurality of optical sources are configured to project the plurality of projected lights in a direction parallel to a main surface of the window, and
wherein the path variation unit is configured such that at least a part thereof is inclined at an angle with respect to the main surface of the window to reflect the plurality of lights toward the main surface of the window.

* * * * *